United States Patent [19]

Welsh

[11] Patent Number: 4,603,889
[45] Date of Patent: Aug. 5, 1986

[54] DIFFERENTIAL PITCH THREADED FASTENER, AND ASSEMBLY

[76] Inventor: James W. Welsh, 6460 Printwood, San Diego, Calif. 92117

[21] Appl. No.: 519,021

[22] Filed: Aug. 1, 1983

Related U.S. Application Data

[63] Continuation-in-part of Ser. No. 335,230, Dec. 28, 1981, Pat. No. 4,479,666, which is a continuation of Ser. No. 101,204, Dec. 7, 1979, Pat. No. 4,310,181.

[51] Int. Cl.$^4$ .............................................. F16L 55/00
[52] U.S. Cl. ...................................... 285/175; 285/39; 285/355; 285/369
[58] Field of Search .............. 285/175, 355, 390, 369, 285/417, 333, 334, 39; 403/343

[56] References Cited

U.S. PATENT DOCUMENTS

| | | | |
|---|---|---|---|
| 279,086 | 6/1883 | Emery | 285/175 X |
| 349,146 | 9/1886 | Duff | 285/175 |
| 720,578 | 2/1903 | Greenfield | 285/175 |
| 1,583,126 | 5/1926 | Crane | 285/175 |
| 2,122,757 | 7/1938 | Scott | 285/175 X |
| 2,783,809 | 3/1957 | Haines | 285/175 X |
| 2,906,152 | 9/1959 | Brase | 285/175 X |
| 4,310,181 | 1/1982 | Welsh . | |
| 4,373,754 | 2/1983 | Bollfrass et al. | 285/355 X |

Primary Examiner—Dave W. Arola
Attorney, Agent, or Firm—William W. Haefliger

[57] ABSTRACT

A threaded fastener having an axis adapted to thread connect to two bodies for holding such bodies in fastened condition, one body having one thread and another body having another thread,
the fastener comprising
(a) threading having first and second load flanks which face axially oppositely,
(b) said first flank defining a first pitch, and said second flank defining a second pitch, said pitches being different and characterized in that when said fastener is screwed onto body threads said first flank tightens against said one body thread when said second flank tightens against said other body thread.

8 Claims, 13 Drawing Figures

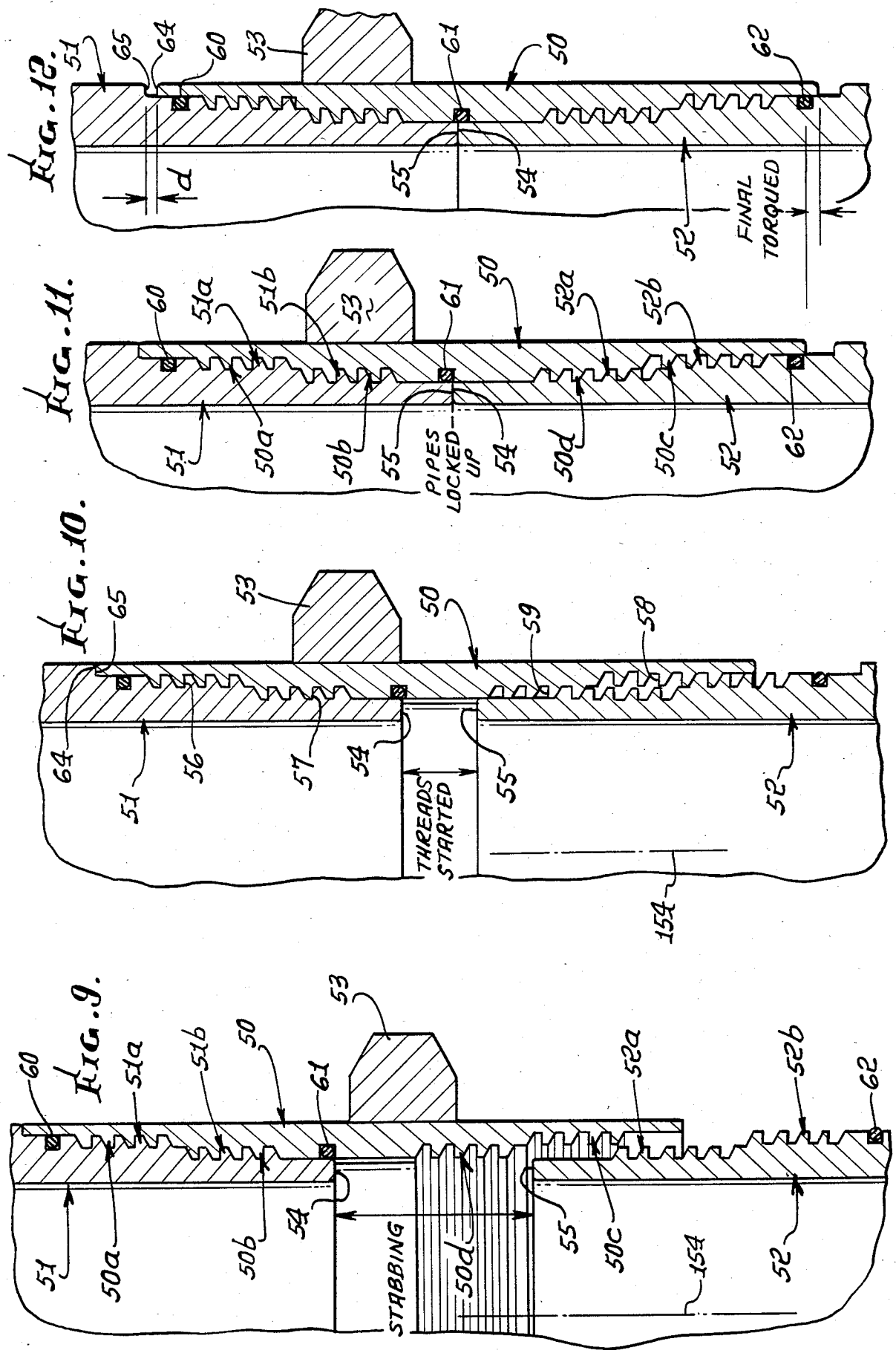

DIFFERENTIAL PITCH THREADED FASTENER, AND ASSEMBLY

This application is a continuation-in-part of my prior application of Ser. No. 335,230, filed Dec. 28, 1981, now U.S. Pat. No. 4,479,666, which was a continuation application of Ser. No. 101,204, filed Dec. 7, 1979, now U.S. Pat. 4,310,181.

BACKGROUND OF THE INVENTION

This invention relates generally to threaded connections between members; more particularly it concerns the provision of a differentially threaded connector characterized as making-up to threaded members to provide a substantial increase in net area in tension in the members to be joined, as well as providing more favorable strength-to-weight-to size relationships.

There is a need for easily made up threaded connections which will not be weakened by load stresses or strains induced by reversing tension-compression, internal and external pressure, torsion, bending and thermal variances, and which have mechanical integrity especially in shock and vibration environments. In particular, there is a need for tubular connections exhibiting these characteristics or advantages, and usable for example in the oil industry.

SUMMARY OF THE INVENTION

It is a major object of the invention to provide a connector, and a connection established by the connector, meeting the above need. Basically, the connector is adapted to thread connect two bodies or members for holding them in fastened condition, one body having one thread, and the other body having another thread, the fastener comprising (a) threading having first and second load flanks which face axially oppositely, (b) said first flank defining a first pitch, and the second flank defining a second pitch, such pitches being different and characterized in that when said fastener is screwed into body thread, said first flank tightens against the one body thread when the second flank tightens against said other body thread. As both first and second differential threads have a common root diameter they are referred to as integral thread forms, i.e. "IPF".

As will appear, the described flanks may be at opposite sides of the same thread form, or may be on different thread sections, as for example two-stepped thread sections on a tubular connector; the flanks are typically progressively tightened to the threads of the two bodies in response to connector rotation and with the bodies in abutting relation; the differential thread flanks may be on external or internal threads, and the thread crest between the differential flanks on the same thread may have constant or progressively changing width along the thread length.

Further, the differential thread form providing both coarse and fine threading on the same length of thread may be easily formed by metal removal from a standard coarse thread, or for example an Acme thread.

These and other objects and advantages of the invention, as well as the details of an illustrative embodiment, will be more fully understood from the following description and drawings, in which:

DRAWING DESCRIPTION

FIGS. 9-12 are vertical sections, in axial radial planes, showing progressive make-up of a tubular threaded connector to pipe section, the connector and pipe sections having two-step threads embodying the invention.

DETAILED DESCRIPTION

Figure 1:
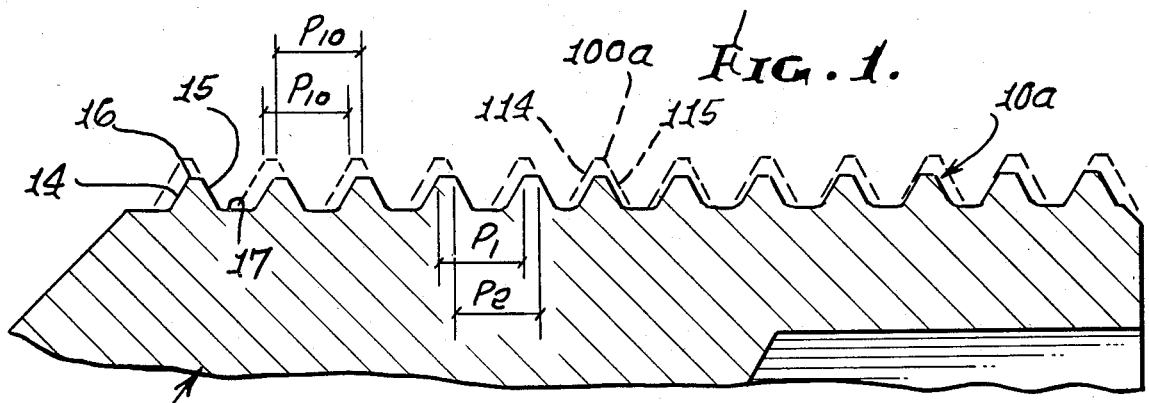
FIG. 1 is a section in an axial radial plane through a thread on a tubular or solid cylindrical fastener, embodying the invention.

The thréaded fastener 10 shown in FIGS. 1–5 is adapted to thread connect to two bodies (see bodies 11 and 12 in FIGS. 2-5) for holding them in fastened condition. Bodies 11 and 12 have respective threads 11a and 12a, and may be considered as female (internal) threads whereas the helical thread 10a on fastener 10 may be considered as a male (external) thread. These relationships may be reversed, i.e. threads 11a and 12a may be male threads, and thread 10a a female thread. Elements 10–12 are coaxial, and have a common axis 13.

Referring again to FIG. 1, the thread 10a has first and second load flanks 14 and 15 which face axially oppositely, and a crest 16 between such flanks. The thread root is indicated at 17. The thread 10a may be formed either directly or in a secondary operation by removing metal from a stock thread shown in broken lines at 100a, and having load flanks at 114 and 115. Successive turns or flights of flank 114 define a pitch $P_{10}$ and successive turns of flanks 115 define the same pitch, $P_{10}$.

It is characteristic of thread 10a that the first flank 14 has a first pitch $P_1$ and the second flank 15 has a second pitch $P_2$, where $P_1$ and $P_2$ are unequal i.e. different. The difference is such, that when the fastener is received or turned into (or meshes with) threads 11a and 12a of bodies 11 and 12, the first flank 14 tightens against one body thread (i.e. flank 20 of thread 11a) and that the second flank 15 tightens against the other body thread (i.e. flank 21 of thread 12a), where flanks 20 and 21 face in axially opposite direction. See FIG. 5 in this regard. Note in FIGS. 2-4 that as fastener 10 thread 10a progressively advances into the bodies 11 and 12, it first encounters thread 11a in body 11, and later encounters thread 12a on body 12. Note further that thread 11a also has flank 22, and that thread 12a also has flank 23, as shown. In FIG. 5, the ends 24 and 25 of the bodies 11 and 12 are shown tightened together, when flanks 14 and 20 tighten together, and flanks 15 and 21 tighten together.

Further characteristics of the thread 10a are listed as follows:

(i) pitch $P_1$ is less than $P_2$, i.e. load flank 14 defining pitch $P_1$ defines a "fine" thread (for example seven full threads per inch); whereas load flank 15 defining pitch $P_2$ defines a "coarse" thread (for example six full threads per inch). These values are by way of example only.

(ii) The thread 10a has a crest 26 between the flanks, the crest having constant axial length along the thread, axially of the fastener.

(iii) The flanks 14 and 15 are at opposite sides of the same thread form.

(iii) The flanks 14 and 15 extend axially to substantially the same extents along the fastener.

Figure 5:
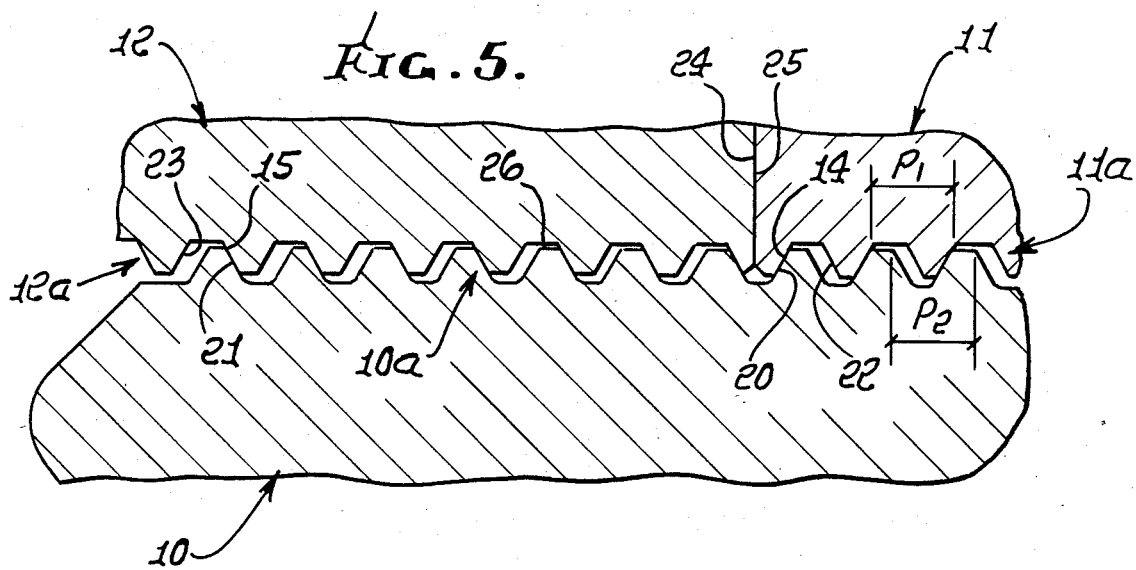
Figure 6:
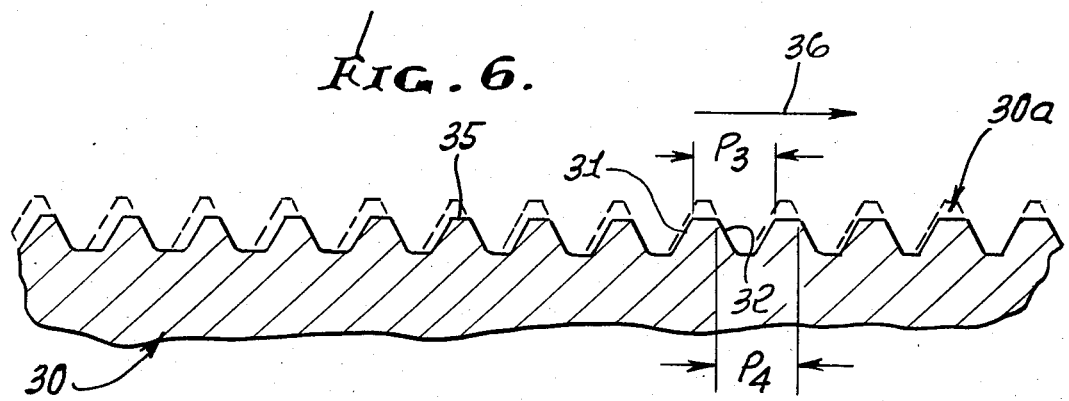
FIG. 6 is a view like FIG. 1, but showing a modified fastener thread.

FIG. 6 shows a modified fastener 30 having a helical thread 30a also adapted to mesh with and tighten against the threads 11a and 12a of bodies 11 and 12 in the same manner as in FIG. 5, to hold the bodies together. Again, the pitch $P_3$ of flank 31 differs from the pitch $P_4$ of flank 32, i.e. $P_3 P_4$ for example so that flank 31 defines a fine thread, and flank 32 defines a coarse thread. Crest 35 between such flanks progressively changes along the thread lengths; for example, crest 35 increases in length in the direction of arrow 36, i.e. away from the forward end of the fastener, or from the end with coarse, toward the end with fine pitch threads.

Figure 7:
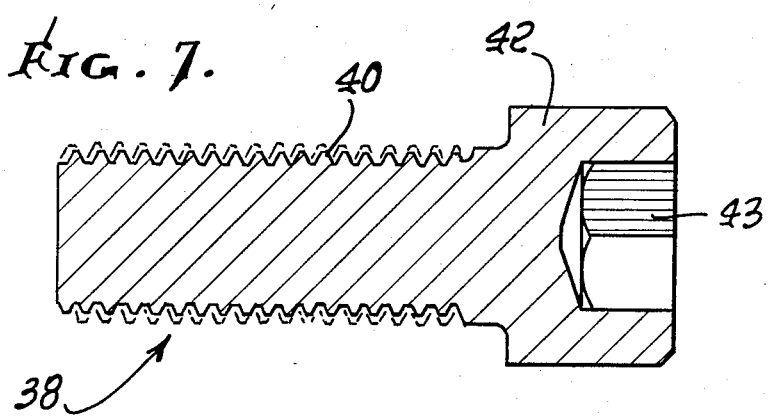
FIGS. 7 and 8 are sections through representative fasteners embodying the invention.
Figure 8:
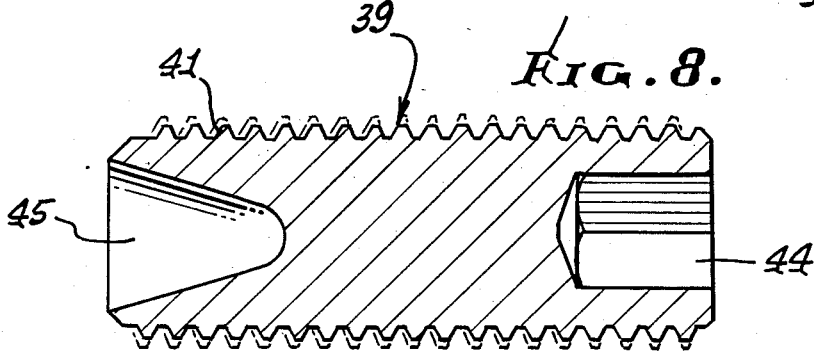

FIGS. 7 and 8 show two representative fasteners 38 and 39 embodying external threads 40 and 41 which may be of the form of either of threads 10 and 30 discussed above. Fastener 38 has an enlarged head at 42 defining a recess 43 which may be hexagonal to form a wrenching socket. Fastener 39 form a similar recess 44 in one end thereof, which is not enlarged. Also, fastener 39 has a weight reducing recess 45 in its opposite end. The broken lines correspond to lines 100a in FIG. 1.

In FIG. 5, the flank 15 extent engaged with body thread 12a may be considered as on a first section of thread 10a, and the flank 14 extent engaged against body thread 11a may be considered as on a second section of thread 10a, such first and second sections of thread 10a being separate in their extents. Also, those sections merge or connect with one another.

FIGS. 9–12 illustrate application of the invention to a tubular connector 50 rotatable to interconnect upper and lower pipes 51 and 52, as for example oil well pipe, tubing or casing. An external tool to rotate the connector appears at 53 and the pipe and connector common axis is shown at 154, in FIG. 9. The upper pipe 51 has stepped external pin threads 51a and 51b; and the lower pipe has stepped external pin threads 52a and 52b. The connector has stepped upper box threads 50a and 50b, and stepped lower box threads 50c and 50d. Prior to interconnection, the connector is made-up to the upper pipe 51, as by mesh connecting thread 50a with thread 51a, and thread 50b with 51b; therefore, pipe 51 and the connector are stabbed as a unit, downwardly, until the lower end of thread 50c lands on the upper end of thread 52a, and the lower end of thread 50d lands on the upper end of thread 52b. Then, as shown in FIG. 10, the upper pipe 51 and connector 50 are rotated as a unit until lower end 54 of pipe 50 lands on upper end 55 of lower pipe 52, and is prevented from turning as shown in FIG. 11. Finally, the connector 50 is rotated relative to the radially locked-up pipes to tighten the axial interconnection of the pipes and connector, as shown in FIG. 12. Note the axial displacement of the connector (during such tightening) indicated at "d" in FIG. 12, relative to pipe 51. See also seals 60–62.

If the "running-on" torque was applied directly to the connector, it can be applied up to full torque limits. If the "running-on" torque was applied only to the upper pipe (instead of to the connector), it must be removed as soon as the 2nd pipe "bottoms" on the first pipe, or when the opposing flat end surfaces 54 and 55 of the pipes are landed or shouldered. The remaining torque to achieve a pre-loaded joint must be applied directly to the connector.

At the time of shouldering between the two pipes, the upper pipe ceases to turn, and the connector begins to function as a differentially threaded union instead of as a box threaded extension at the bottom end of the upper pipe. Turning the differentially threaded connector (after the upper pipe stops turning) tends to unscrew or back the connector off the upper pipe at the same time it continues to be screwed further down onto the lower pipe. If the threads in both ends of the connector (and the corresponding threads on the pipes) had identical pitches, the connector could be turned down until it reached the limits of threads on the lower pipe without increasing the pipe-to-pipe preload.

In accordance with the invention, the pitch (lead) of downward facing flanks 56 and 57 on the set of two-step threads joining the upper end of the differentially threaded connector to the bottom end of the upper pipe is slightly "finer" (less coarse) than the pitch (lead) of upward facing flanks 58 and 59 on the set of two-step threads joining the lower end of the connector to the top end of the lower pipe, and application of torque (after the upper pipe stops turning) generates a tensile force between the threads in opposite ends of the connector. This torque is reacted or resisted by the sum of friction between opposing load flanks, bending and shear, or bending and tensile forces in the load flanks and roots of opposite sets of threads, and ultimately by tension in the body of the connector which is matched by an increasing compression force in the opposing faces 54 and 55 of the two joined pipe sections.

In the context of load line fastening systems, "finer" (less coarse) thread pitches or leads means that one of the threads in the differential set is numerically higher than the other. For illustration, assume the pitch of the box threads in the upper end of the differentially threaded connector which engage pin threads on the bottom end of the upper pipe is exactly 5.0 millimeters. A normal single start 5.0 mm thread measures 0.196850 inches between common points on the thread form, or a bolt with 5.0 mm threads would advance through a nut 0.196850 inches per turn. At the other (lower) end of the differentially threaded connector, the pitch of the threads which engage the pin threads on the top end of the lower pipe is exactly 5 threads per inch. A single start 5 threads per inch thread measures 0.20000 inches between common points, or a bolt with "−5" threads would advance through a nut 0.20000 inches per turn.

Combining these two "standard" threads-one metric, the other an inch series-in the differentially threaded connector yields a net closing rate, (NCR) of 0.20000 minus 0.196850 or 0.00315 inch per turn. Thus, after the upper pipe bottoms on the lower pipe, continuing to turn the connector with respect to the two stationary pipe sections causes pulling of the connector down onto the lower pipe faster than it is lowered from the upper pipe. Each 90° the differentially threaded connector is turned with respect to the radially fixed pipes diminishes the axial distance between the upper threads on the upper pipe and the lower threads on the lower pipe by 0.0007875 inches. After surface irregularities and clearances are accounted for, this discrepancy in axial dimensions must ultimately be accounted for by all or some combination of threads yielding, stretching in the body of the connector, deformation in the end faces of the pipes, or shrinkage in the bodies of the pipes.

The differentially threaded connector 50 continues to advance axially downward on the stationary pipe sections at the nominal rate of 0.050 inch for every 90° of turn. Meanwhile the upper pipe is pulled axially downward against the lower pipe another 0.0007875 inch for every 90° of turn on the connector.

In practice, on solid threaded fasteners this increasing resistance is reflected in a very linear and consistent increase in wrench torque. The final mechanical significance of the pipe joint made-up by use of a differentially threaded connector is an effective pre-loaded interface.

Unusually favorable advantages associated with differentially threaded connectors are listed as follows:

A. The differentially threaded connector being forged or upset from higher strength alloys than are usual in tubing, casing or drill pipes can economically be made from much smaller and lighter materials than the pipe sections it holds together. It can easily be heat treated. The critical surfaces can be cold worked. It can be factory pre-lubricated. It can have textured or spline grooves in the exterior surface to increase wrenching efficiency.

B. Higher tensile properties (yield and ultimate) do not necessarily compromise elongation properties so that an optimum mix of hardnesses, ductility and strengths between internal (box) and external (pin) threads can result in longer life threads resistance to galling and bearing surfaces.

C. With higher strength materials, the net area in tension (effective tensile section) in the differentially threaded connector can be reduced, while the corresponding net area in tension in the lower strength pipes to be joined can be increased. This equates to reduced outside diameters, increased inside diameters, more favorable strength-to-weight-to-size relationships and/or more generous margins of safety within the dimensions currently used in pin-to-box and connector type threaded joints.

D. In breaking (uncoupling) pipe joined by differentially threaded connectors, application of reverse torque to the connector is identical to backing-off a typical box-to-pin joint. The connector backs-off the lower pipe, lifting the upper pipe with it as it turns disconnecting the pipe-to-pipe joint. Once the two pipes no longer bear at their end faces, the upper pipe and the connector are free to turn with respect to one another, to disconnect the upper pipe-to-connector joint or remain connected for subsequent storage and reuse.

While requiring that threads in parts to be joined are "timed", integral thread forms (ITF) as described herein eliminate the earlier load line fastening system requirement for a controlled amount of axial float in at least one of the four essential thread segments. In solid connectors a dual pitched ITF not only requires timed threads, but also requires that load planes on opposing threads precisely reflect different pitches, while the following flanks of at least one of the thread segments must match the pitch of the load flanks on the opposing threads.

This unique matching of differentially pitched threads in a single tubular union-type, dual threaded connector is compatible with and suited for combining with current two-step (pin-to-box) threading requirements. Of advantage is the fact that one pipe can turn with respect to the other pipe until they abutt and the joined threads are thus automatically timed and there is no need to modify the following flanks of the threads on the pipes themselves, or in the connector. The differential thread service being provided by the connector only after the pipes are radially locked up. See FIGS. 9–12.

The first (down) section 52 of pipe or tubing is typically fitted with a set of standard two-step pin threads, but without necessarily requiring the usual torque shoulder between the threads. The pipe 52 is assumed to be "held in place" (axially and radially).

At any convenient time prior to making-up the pipe sections, a differentially threaded (union-type) tubular connector 50 is screwed up onto the bottom end of second section 51 of pipe as far as the threads allow, or to engage stop shoulders 64 and 65. The bottom end of the differentially threaded connector presents a downward facing set of two-step box threads 50c and 50d which match the upward facing set of two-step pin threads 52a and 52b on the pipe 52. The connector-to-upper pipe thread interface is identical to the connector-to-lower pipe thread interface except for basic thread pitch.

The upper pipe 51 with the differentially threaded connector screwed in place at the bottom end is approximately aligned above the lower pipe preparatory to "stabbing" the box threads 50c and 50d onto the pin threads 52a and 52b.

"Running-on" torque and final make-up torque are described above. Torque vs tension relationship during "running-on" and during breaking is normal for the pitch and friction conditions in mating single threads. Final make-up torque vs tension relationships are typical for the dual thread frictions and the resulting extremely fine thread "lead" associated with the differential pitches.

FIGS. 1 and 6 and associated descriptions refer to modifying pitches on the connector without specifically discussing modifying the female threads, slightly. In actual practice any of the thread elements (fine male, fine female, coarse male or coarse female) can incorporate varying degrees of modification. As described above, if in the material strength properties require a thicker thread section in one of the female threads, the other three thread elements can be adjusted accordingly, yielding optimum geometry for any given mix of materials (coarse female, fine female or doubled ended male connector) or either pipe (pin) threads and the double ended connector (box) threads in the case of two-step threads.

Fasteners embodying the invention may have (a) both differential pitch threads located externally of the tubular member;

(b) both differential pitch threads located internally of the tubular member;

(c) one such thread located internally and the other thread located externally, end-to-end;

(d) same as (c) but when the threads are nested, i.e. the internally and externally axially coinciding.

Figure 13:
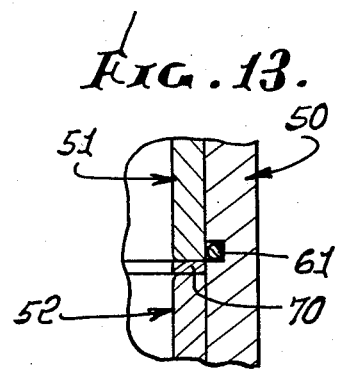
FIG. 13 is a fragmentary section illustrating a modification.

FIG. 13 illustrates the provision of means 70 associated with the opposed ends of the pipes 51 and 52 adapted to be compressively displaced by tightening of the pipe ends thereagainst. For example, the means 70 may comprise a relatively soft and ductile metal ring (for example brass, where the pipes consist of steel).

As the differential connector is turned further, after pipe end engagement with ring 70, clearances and tolerances in the intermeshing threads are taken up. As the resistance to turning the connector 50 increases, the ring 70 will be squeezed and somewhat deflected, which in turn allows the connector 70 to be rotated to greater extent than it can be rotated where the pipe ends directly interengaged as in FIG. 12.

In essence, the ring 70 serves as a "smart" element in that it allows the material in pipes to be joined, and in the connector, accept preloading up to a safe (designed-in) limit. Thereafter, additional torque (inadvertent or intentional) applied by that 53 is reacted in the connected members with only very slightly increasing the preloading of the joint. Ring 70 may easily be replaced when the joint is separated and subsequently again made up.

Figure 2:
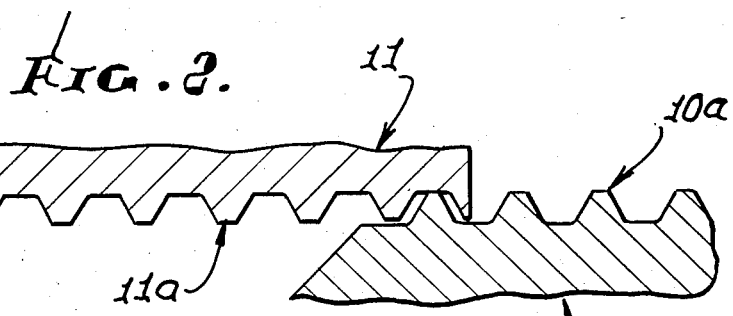
FIGS. 2-5 are sections in an axial radial plane showing the FIG. 1 fastener being progressively thread connected into two threaded bodies to be joined together.
Figure 3:
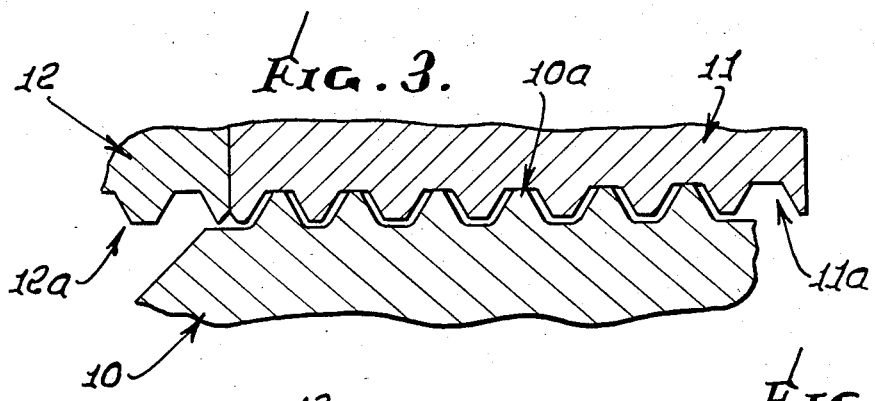
Figure 4:
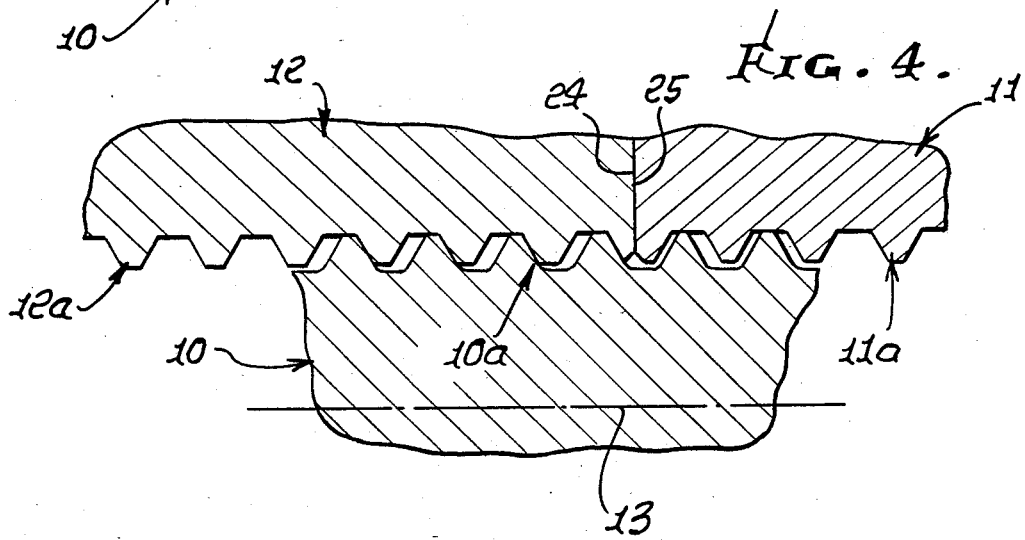

In FIGS. 2–4, there may be clearance between the thread crest and root, as shown in FIG. 5. Minimum clearance may be provided to augment use of the connecting member as a shear body. As is clearly shown in FIG. 10, the connector two stepped upper box thread has an uppermost thread, and the upper pipe two stepped external pin thread has a lowermost thread, the thickness of the connector material radially outwardly of the tip of said lowermost thread being substantially less than the thickness of the upper pipe material radially inwardly of the tip of said uppermost thread. This is also true with respect to the lower pipe pin thread and the connector lower box threading. These relationships taken with the higher strength of the metal alloy connector, facilitate the flush relationship of the connector and pipes, as shown.

I claim:

1. In combination,
   (a) upper and lower pipes and a tubular connector interconnecting said pipes so that the connector and pipes extend in coaxial relation,
   (b) the upper pipe having two stepped external pin thread, and the lower pipe having two stepped external pin threads, the connector having two stepped upper box threads meshing with the upper pipe pin threads, and two stepped lower box threads meshing with the lower pipe pin threads,
   (c) the connector upper box threads having first load flanks which face in one axial direction, and the connector lower box threads having second load flanks which face in the opposite axial direction, the first flanks defining a first pitch and the second flanks defining a second pitch, said pitches being different and characterized in that after the upper pipe endwise bottoms on the lower pipe and when the connector is rotated, the first flanks tighten against the upper pin threads and the second flanks tighten against the lower pipe threads,
   (d) the connector having an outer diameter along its length, which is substantially flush with the outer diameter defined by said pipes, and the connector having an inner diameter along its length which is everywhere less than the inner diameter defined by said pipes.

2. The fastener of claim 1 wherein one of said upper and lower box threads has a crest of constant axial length along the thread axially of the connector.

3. The fastener of claim 1 wherein said connector first load flanks face downwardly, and said connector second load flanks face upwardly, said first pitch of the first load flanks being finer than the second pitch of the second load flanks.

4. The fastener of claim 1 wherein the connector consists of an alloy of higher strength than the material of said pipes.

5. The fastener of claim 1 wherein said two pipes are held in end abutting relation by the connector.

6. The fastener of claim 3 wherein said first load flanks are on said two stepped upper box threads, and said second load flanks are on said two stepped lower box threads.

7. The fastener of claim 1 wherein the connector two stepped upper box thread has an uppermost thread, and the upper pipe two stepped external pin threads have a lowermost thread, the thickness of the connector material radially outwardly of the tip of said lowermost thread being substantially less than the thickness of the upper pipe material radially inwardly of the tip of said uppermost thread.

8. The fastener of claim 1 wherein the pipes have opposed ends, and including means associated with said opposed ends and located radially inwardly of said connector to be compressively displaced by tightening of said ends thereagainst.

* * * * *